United States Patent
Bang et al.

(10) Patent No.: US 10,114,487 B2
(45) Date of Patent: Oct. 30, 2018

(54) CONTROL OF ELECTRONIC DEVICES

(71) Applicant: Elliptic Laboratories AS, Oslo (NO)

(72) Inventors: Hans Jørgen Bang, Oslo (NO); Tobias Gulden Dahl, Oslo (NO)

(73) Assignee: ELLIPTIC LABORATORIES AS, Oslo (NO)

( * ) Notice: Subject to any disclaimer, the term of this patent is extended or adjusted under 35 U.S.C. 154(b) by 72 days.

(21) Appl. No.: 14/598,413

(22) Filed: Jan. 16, 2015

(65) Prior Publication Data

US 2015/0123929 A1 May 7, 2015

Related U.S. Application Data

(63) Continuation of application No. PCT/GB2013/051909, filed on Jul. 17, 2013.

(30) Foreign Application Priority Data

Jul. 17, 2012 (GB) .................................. 1212685.0

(51) Int. Cl.
*G06F 3/0488* (2013.01)
*G06F 3/041* (2006.01)

(52) U.S. Cl.
CPC .......... *G06F 3/0412* (2013.01); *G06F 3/0488* (2013.01); *G06F 2203/04101* (2013.01); *G06F 2203/04106* (2013.01)

(58) Field of Classification Search
CPC ................. G06F 3/0488; G06F 3/0412; G06F 2203/04106
See application file for complete search history.

(56) References Cited

U.S. PATENT DOCUMENTS

| 7,157,649 | B2 * | 1/2007 | Hill | ...................... G06F 3/0433 178/18.01 |
| 2003/0048260 | A1 * | 3/2003 | Matusis | ................ G06F 3/0233 345/173 |
| 2006/0161871 | A1 * | 7/2006 | Hotelling | .............. G06F 3/0485 715/863 |
| 2008/0158168 | A1 * | 7/2008 | Westerman | ........ G06K 9/00375 345/173 |
| 2010/0026667 | A1 * | 2/2010 | Bernstein | .............. G06F 3/0436 345/177 |
| 2010/0264830 | A1 * | 10/2010 | Van Endert | ............. G06F 3/017 315/149 |
| 2011/0043489 | A1 * | 2/2011 | Yoshimoto | ............ G06F 3/0416 345/175 |

(Continued)

FOREIGN PATENT DOCUMENTS

| WO | 2006/067436 | 6/2006 |
| WO | 2009/115799 | 9/2009 |

OTHER PUBLICATIONS

Written Opinion dated Jan. 29, 2015 from International Application No. PCT/GB2013/051909.

(Continued)

*Primary Examiner* — Charles Hicks
(74) *Attorney, Agent, or Firm* — Beyer Law Group LLP

(57) ABSTRACT

An electronic device comprising a touch-sensitive surface and a touchless detecting system for detecting movement of a finger towards the surface. The device is configured to associate said movement with a predicted touch on said surface and to issue a report of said predicted touch.

21 Claims, 2 Drawing Sheets

(56) References Cited

U.S. PATENT DOCUMENTS

2011/0175832 A1* 7/2011 Miyazawa .............. G06F 3/041
                                                                     345/173

OTHER PUBLICATIONS

International Search Report dated Nov. 4, 2013 from International Application No. PCT/GB2013/051909.
Written Opinion dated Nov. 4, 2013 from International Application No. PCT/GB2013/051909.

* cited by examiner

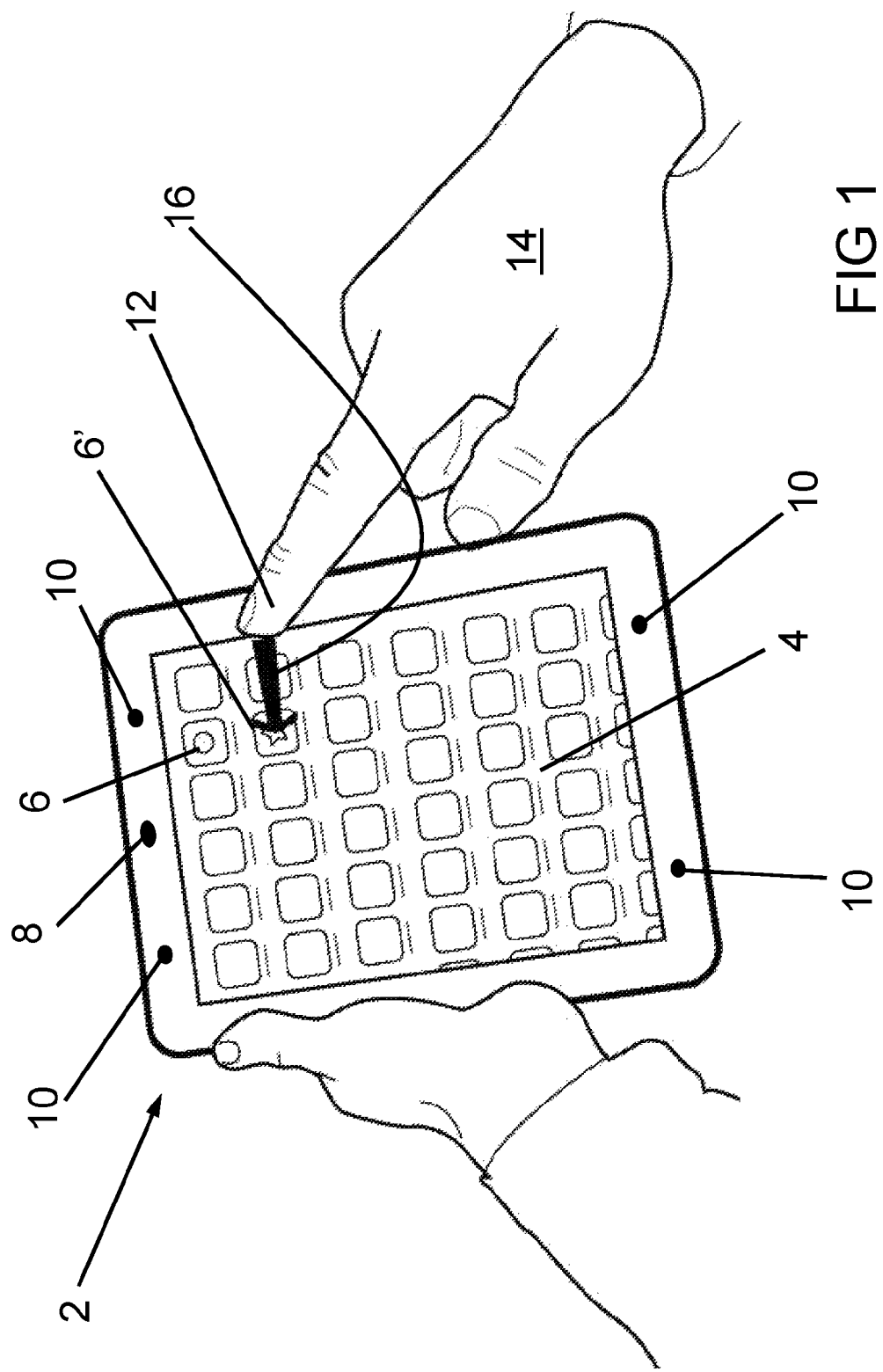

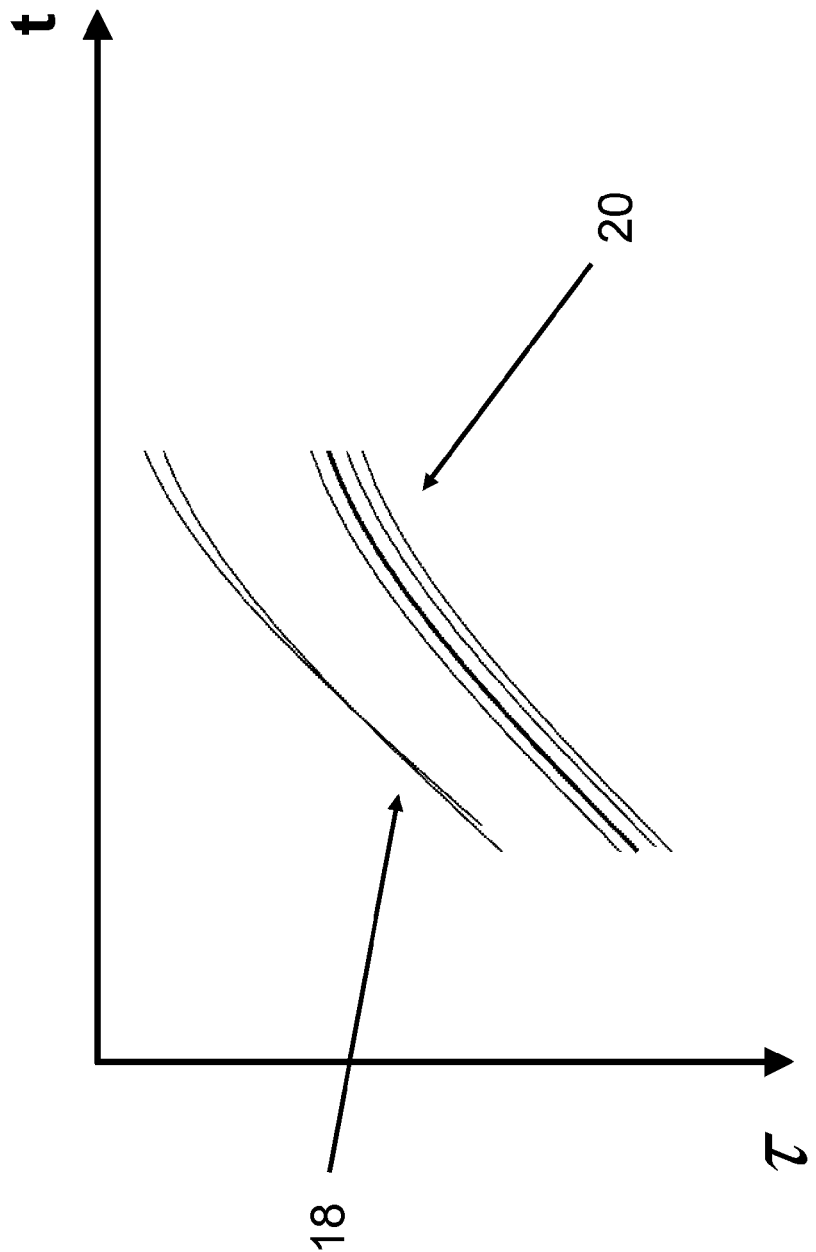

CONTROL OF ELECTRONIC DEVICES

CROSS-REFERENCE TO RELATED APPLICATIONS

This application is a Continuation of International Application No. PCT/GB2013/051909, filed on Jul. 17, 2013 which claims priority to GB Application No. 1212685.0, filed on Jul. 17, 2012. These applications are incorporated herein by reference in their entirety.

This invention relates to interfaces with which a user can interact with an electronic device in order to control some aspect of it.

Particularly with the increasing popularity of smart phones and table computers, touch-screens and touch-pads have become an accepted way for users to interact with electronic devices in a simple an intuitive way. Nonetheless the Applicant believes that functionality and user experience of such devices can be enhanced using some aspects of touchless technology.

When viewed from a first aspect the invention provides an electronic device comprising a touch-sensitive surface and a touchless detecting system for detecting movement of a finger towards the surface; the device being configured to associate said movement with a predicted touch on said surface and to issue a report of said predicted touch.

The invention extends to a method of operating an electronic device comprising a touch-sensitive surface and a touchless detecting system, the method comprising:

detecting movement of a finger towards the surface using the touchless detecting system;

associating said movement with a predicted touch on said surface; and issuing a report of said predicted touch.

A computer software product, either on a carrier or not, comprising instructions for operating an electronic device comprising a touch-sensitive surface and a touchless detecting system, the instructions comprising:

instructions for detecting movement of a finger towards the surface using the touchless detecting system;

instructions for associating said movement with a predicted touch on said surface; and instructions for issuing a report of said predicted touch.

Thus it will be seen by those skilled in the art that in accordance with the present invention touchless detection of finger movement is used to make a prediction about a user touching the screen. For example if the touchless detecting system determines that a user's finger is approaching a touch-screen within a certain range of speeds and from a close enough distance, touching the screen is inevitable. However knowing in advance that a user will touch the screen, an optionally some additional information about the touch event, can be exploited to give an improved experience of additional functionality.

In a set of embodiments the report of said predicted touch comprises information relating to a position on the surface that it is predicted the user will touch. This can be deduced, for example, from the position of the finger and its trajectory as determined by the touchless detecting system.

The report of predicted touch, especially where it includes position information, can enhance the operation of the touch-sensitive surface (which may be a touch-screen or touch-pad for example) in some embodiments by allowing the sensitivity of the touch-sensitive surface to be increased. Typically in touch-sensitive surfaces the sensitivity, that is the threshold for detecting a touch event, can be selected to some extent. This would normally be chosen to balance the competing requirements of making the surface as responsive as possible whilst avoiding false detections. However the Applicant has appreciated that with the additional information provided by the report of predicted touch, the sensitivity can be enhanced with the report being used to reduce the likelihood of false detections.

In a set of embodiments the report of said predicted touch comprises information relating to the speed and/or direction of the user's finger prior to touching the screen. This allows, for example, applications running on the device to distinguish different inputs for the same point touched on the surface depending on the speed and/or direction. For example the speed of the approaching finger could be used to allow an application to distinguish between a light touch and a heavy touch and to perform different operations accordingly. The direction from which the finger approached could be used, for example, initiate a scroll as soon as the touch is detected without needing the touch-sensitive detection to determine a (or an initial) direction.

In a set of embodiments the device provides feedback in response to said predicted touch. The feedback could be general—such as waking up from a sleep state or switching on or increasing the brightness of a screen. Additionally or alternatively feedback regarding the predicted position of the touch could be given—e.g. to display a highlight, enlarge a button, or display an icon—when the report includes position information as in some embodiments. It should be appreciated that the feedback being discussed here is not akin to that provided in known interfaces where buttons are enlarged on the basis of proximity of a user's finger to the button on the screen (or even after it is touched). Here the feedback is based on a prediction of where the user will touch the touch-sensitive surface based on movement of the finger towards the screen. Feedback may be visual, audible, haptic or any combination thereof. The feedback could be static or dynamic—e.g. based on the distance from the screen. For example a predicted touch could result in a circle or 'cross-hair' icon being displayed with diminishing diameter as the finger approaches the surface.

In a set of embodiments, the feedback comprises a GUI element being enlarged as the finger approaches the touch-sensitive surface. The size of the GUI element may be inversely proportional to the distance of the finger from the screen over at least a range of distances. The GUI element which is affected is dependent on the position of the predicted touch. It may be an icon on the screen, e.g. a button or a keypad, but in a set of embodiments, it is the whole screen that is enlarged as the finger approaches the screen. This has the effect of 'zooming in' on the region in which a touch is predicted, rather than generally enlarging the screen.

The touchless detection system could give a single report or could give a plurality of reports of predicted touch, especially where the report includes information relating to the predicted position of the touch or the speed or direction of approach. This could be used, for example, to update the feedback given. Thus in the example mentioned above of an icon such as a circle, the icon could move to reflect the updates in the predicted position.

The Applicant has appreciated that as well or instead of feedback which is apparent to a user, the report of predicted touch could be used to initiate or alter a process in the device which is not apparent to a user. In one exemplary set of embodiments the report is used to launch a software application—e.g. running in the background. This could have several benefits. For example it could allow the device to respond more quickly to the user's touch by reducing any lag necessary for an application to start. Thus, where the report includes position information, this could be used to start to launch an application before the user presses the icon at the location of the predicted touch.

If the lag between a user touching a surface and an application or function being operational can be reduced or eliminated in the embodiments outlined above, this could also allow some functions of the device to be put into a lower power sleep mode more readily thus saving power overall.

The Applicant has further realised that if a reliable prediction of touch is available, it may not actually be necessary for the user to touch the touch-sensitive surface of the device in order to determine the user's intended input. Thus whilst in some embodiments a certain function is not carried out unless and until the touch-sensitive surface is touched by the user (even though some other action or function may be carried out before this), in another set of embodiments an action or function is carried out on the basis of the report of predicted touch but no further action or function is carried out if/when the surface is touched. As well as giving greater flexibility to the designers of devices and software applications for them, the Applicant sees a benefit in this in helping to enhance users' familiarity with the idea of interacting with a device without having to touch it and thereby facilitating acceptance of, and familiarity with, devices which have more extensive touchless capability.

The touchless detecting system could be based on any suitable technology such as capacitive sensing, optical cameras, or infra-red cameras. In a preferred set of embodiments the touchless detecting system comprises an acoustic touchless detecting system. As will be familiar to those skilled in this particular art, these are arranged to transmit acoustic signals such as chirps and then to measure the echoic profile of the signals reflected from a user's finger/hand to determine its location and/or motion. Preferably the signals employed are ultrasonic—i.e. have at least a mean or median frequency above 20 kHz. A combination of touchless technologies could be employed.

In one set of embodiments time impulse responses for some or all transmitter-receiver combinations subset are obtained. To this end short impulses may be employed as transmit signals in which case $r_i(\tau) \approx h_{ij}(\tau)$—i.e. an approximation of the impulse response can be obtained directly. Although this approach has certain advantages from an implementational point of view, the received echoes may be susceptible to both environmental and internal noise in the apparatus due to limitations on the peak power generated by the transmitter. Alternatively, codes such as chirps or pseudo-random noise sequences may be used as transmit signals in order to increase the accumulated energy returned from a particular reflector. Such an approach may be accompanied by pulse compression processing at the receiver in order to improve the resolution in the measured impulse response. One particular example is matched filtering where the received signal is convolved with the time reverse of the transmit signal yielding an approximation to the true impulse response, i.e. $h_{ij}(\tau) \approx s_j(-\tau) * r_i(\tau)$ Other impulse response estimation techniques are described in more detail in WO 2006/067436. Further details on the analysis if impulse responses to determine position and movement of objects are given in the Applicant's earlier published applications, e.g. WO 2009/115799.

The touch-sensitive surface could be a touch-screen as used in many devices such as smart-phones and tablet computers or a separate touch-pad—as provided for example in laptops, netbooks etc.

The touchless system could be used solely for touch predictions as outlined herein but may additionally be used for 'pure' touchless tracking or gesture recognition.

In a set of embodiments the touchless detecting system is configured to detect preferentially the position of a user's fingertip over other parts of the hand. This makes it easier to predict more accurately when, and possibly where, the finger will touch the surface as opposed to a general movement of the hand in the vicinity of the surface. There are several ways in which this could be done. One possibility would be to use edge detection in echoic profiles such as impulse response images. Another would be to use block-matching as is described in greater detail in WO 2011/036486.

An embodiment of the invention will now be described, by way of example only, with reference to the accompanying drawings in which:

FIG. 1 is a schematic illustration of an electronic device in accordance with the invention; and FIG. 2 is a diagram representing an impulse response image for a hand with an extended finger moving towards a touch-screen FIG. 1 shows a portable electronic device in the form of a tablet computer 2. The major part of the front face of the tablet 2 is taken up by a touch-screen 4 and in FIG. 1 this is shown as depicting a number of icons 6 representing different software applications ("apps") which the user can launch and run by touching the corresponding icon.

Within the bezel surrounding the touch-screen 4 are an ultrasonic transmitter 8 and four ultrasonic receivers 10. These could be dedicated ultrasonic transducers or they could also be used as audible loudspeakers and microphones when driven at the appropriate frequencies. More transmitters could be used and more or fewer receivers depending on the application.

In operation the device causes the transmitter 8 to transmit a regular series of ultrasonic chirps (signals with rising or falling frequency). By transmitting these chirps towards the user's finger 12 and hand 14, their position and movement within the scene can be inferred from the reflected echo signals which are received by the receivers 10. The underlying principle used is that time difference between transmission and reception of an echo signal is directly proportional to the combined distance from the transmitter to the reflector and back to the receiver. In principle, by combining the time-of-flight measurements from three or more transmitter-receiver combinations the position of the reflector in XYZ space can be uniquely identified.

The relationship between the transmit and receive signals may be represented as $$r_i(\tau) = h_{ij}(\tau) * s_j(\tau) + n_i(\tau)$$

where $s_j(\tau)$ is the transmitted signal on the jth transmitter
$h_{ij}(\tau)$ is the channel's impulse response
$n_i(\tau)$ is an environmental noise term
$r_i(\tau)$ is the resulting signal on the ith microphone
and * denotes a convolution operator.

The time argument $\tau$ in the above transmit-receive relationship refers to the time passed from the onset of the transmit signal $s_j(\tau)$. To specify the time of the onset one may introduce a second argument, t, i.e.

$$r_i(\tau,t) = h_{ij}(\tau,t) * s_j(\tau,t) + n_i(\tau,t)$$

The first argument $\tau$ is sometimes referred to as local time while the second argument t is referred to as global time. Whenever there is a change in the echo environment the impulse response $h_{ij}(\tau,t)$ changes as a function of global time. This is simply to say that the received echo signals changes with the onset of the transmit signal. Note that in order to estimate the impulse response for a specific time t a signal $s_j(\tau,t)$ must be transmitted. For the purpose of finger tracking the signals are typically transmitted at intervals of milliseconds. In one set of embodiments the duration of the transmit signals may equal the repetition interval in which case the transmit signals can be viewed as one continuous signal.

For each point x in space there is an associated distance-of-flight $d_{ij}$ (distance from transmitter j to x and back to receiver i). A reflector positioned at x at time t will cause a non-zero amplitude in the impulse response signal $h_{ij}(\tau,t)$ for $\tau=d_{ij}/c$ where c is the speed of sound. The exact amplitude of the impulse response will depend on the distance-of-flight and the reflective properties of the reflector.

At the receiver the estimated impulse response signals are stored and manipulated as discrete-time signals $$Z_{ij}(m,n) \stackrel{def}{=} \hat{h}_{ij}(\tau_m, t_n)$$

where $\tau_m = m\Delta\tau$ and $t_n = n\Delta t$. Here $\Delta\tau$ is typically the sampling interval of the analog-to-digital converter and $\Delta t$ is the time difference between consecutive transmit signals. As long as $\Delta\tau$ and $\Delta t$ are chosen sufficiently small, i.e. satisfying Nyquist sampling criterion, this representation causes no loss of information relative to the continuous counterpart. The 2D signals $Z_{ij}(m,n)$ are commonly referred to as impulse response images.

Since the position of a reflector can only change gradually over time the impulse response $Z(m,n)$ will not change abruptly with n, again assuming $\Delta t$ to be small (e.g. on the order of milliseconds). This can be exploited to improve the estimation of the impulse responses and the tracking of the underlying hand motion. If it is postulated that there exists a reflector at time step n positioned at $x(n)$ and moving in space with direction $\Delta x(n)$, the next point in space will be:

$$x(n+1) = x(n) + \Delta x(n)$$

assuming a locally linear motion. Both $x(n)$ and $x(n+1)$ give rise to distance-of-flights $\{d_{ij}(n)\}$ and $\{d_{ij}(n+1)\}$ for each transmitter/receiver pair. The change in distance-of-flight from $d_{ij}(n)$ to $d_{ij}(n+1)$ aligns with a line in the corresponding impulse response image, having the angle $$\alpha_{ij}(n) = \tan^{-1}\left\{\frac{d_{ij}(n+1) - d_k(n)}{c}\right\}$$

Hence, a way to test whether there is a reflector located in $x(n)$ moving in the direction $\Delta x(n)$, is to test for a matching line segment each impulse response image. Matching of line segments by means of 2D filter blocks has been explained by the applicant in WO 2009/115799.

Clearly, once an initial position $x(t_0)$ has been found, this test could be used to track an object throughout the scene, since a test can be conducted as to where the point has moved from one time step to the next. To improve tracking quality, one could at each stage try out a limited number of different $\Delta x(n)$'s, i.e. only the ones that correspond with a reasonable guess at a possible physical motion. More generally one can use a Kalman filter to combine physical measurements with a kinematic model of the motion.

The tracking process could also be applied to a neighbourhood of points $\{x_i(t)\}$, thereby improving the robustness of the tracking process, particularly for reflectors which are not represented as point reflectors within the frequency band of the system. The possible set of reflective points $\{x_i(t)\}$ could be related to prior knowledge of the object being tracked, e.g. they could represent the model of a hand. Such motion model tracking in the impulse response domain allows more accurate tracking of particular objects.

An exemplary impulse response image corresponding to the finger 12 moving towards the touch-screen 4 is shown in FIG. 2. This plots local time $\tau$ on the vertical axis against global time t on the horizontal axis. The narrower, upper group of lines 18 in this diagram which are nearer to the origin of the vertical axis represent echoes from the finger 12 since that is closer to the screen. The other lines 20 represent echoes from the rest of the hand 14. Using the techniques described above, the position and slope of the line 18 corresponding to the trajectory of the finger 12 (shown by the thick arrow 16 in FIG. 1) can be determined.

When the finger 12 is travelling towards the screen 4 at a certain speed and when the finger is within a certain distance (both of which can be obtained empirically) it can be concluded with a high degree of probability that the user will touch the icon 6' which the trajectory 16 intercepts. The touchless detection system reports the predicted touch and the location to the operating system of the device. This can be used by the device to display alter how the icon 6' appears. Moreover it can be used to launch the app associated with the icon before the user actually touches the screen in order to make the device appear more responsive.

Thus it will be appreciated that the embodiment described above demonstrates that a touch detection system comprising a touchless tracking system and a conventional touchscreen working together may have advantages over either system alone. As explained, in a normal working mode the touch event will be detected by the touchless tracking system prior to the touch event itself. However, if the touch event cannot be detected conclusively by the touchless system (since tracking near to a screen is generally more challenging than further away) the event will be detected by the touch-sensitive screen. A missed detection by the touchless subsystem will therefore not be critical to the operation of the touch detection system as a whole. A missed detection by the touchless subsystem will only incur a small increase in delay in the ascribed response to the touch event. The detection criteria for the touchless tracking subsystem may therefore be more restrictive than in the absence of a touch sensitive screen, thereby avoiding false positive detections by the touchless tracking system.

It is important to note that in this embodiment the user will perceive the two separate subsystems (touchless detection and touch-screen) as a single touch detection system, but with a smaller delay than a conventional touch sensitive screen. However in other embodiments this may not be the case: the invention could be used instead to add new functionality for example.

The invention claimed is:

1. An electronic device comprising
a touch-sensitive surface and
a touchless detecting system for detecting movement of a finger towards the surface, wherein the touchless detecting system is configured to transmit an ultrasonic signal, receive a reflected ultrasonic signal, measure an echoic profile of said reflected ultrasonic signal and determine the movement from said echoic profile;
the device being configured to associate said movement with a predicted touch on said surface and to issue a report of said predicted touch, said touchless detecting system being further configured to use edge detection in the echoic profile to detect preferentially the user's fingertip over other parts of the user's hand.

2. The device as claimed in claim 1 wherein the report of said predicted touch comprises information relating to a position on the surface that it is predicted the user will touch.

3. The device as claimed in claim 1 wherein the report of said predicted touch comprises information relating to a speed and/or direction of the user's finger prior to touching the screen.

4. The device as claimed in claim 1 arranged to provide feedback in response to said predicted touch.

5. The device as claimed in claim 4 arranged to provide feedback regarding a predicted position of the touch.

6. The device as claimed in claim 4 wherein the feedback is at least one of: visual, audible or haptic.

7. The device as claimed in claim 4 wherein the feedback comprises a GUI element being enlarged as the finger approaches the touch-sensitive surface.

8. The device as claimed in claim 1 arranged such that the report of predicted touch initiates or alters a process in the device which is not apparent to a user.

9. The device as claimed in claim 1 arranged to carry out an action or function on the basis of the report of predicted touch, but to carry out no further action or function if/when the surface is touched.

10. A method of operating an electronic device comprising a touch-sensitive surface and a touchless detecting system, the method comprising:
  detecting movement of a finger towards the surface using the touchless detecting system;
  using the touchless detecting system to transmit an ultrasonic signal;
  using the touchless detecting system to receive a reflected ultrasonic signal;
  measuring an echoic profile of said reflected ultrasonic signal;
  determining the movement from said echoic profile, using edge detection in the echoic profile to detect preferentially the user's fingertip over other parts of the user's hand;
  associating said movement with a predicted touch on said surface; and
  issuing a report of said touch.

11. A non-transitory, computer-readable medium comprising instructions that, when executed on a suitable processor, operate an electronic device comprising a touch-sensitive surface and a touchless detecting system, the instructions comprising:
  instructions for detecting movement of a finger towards the surface using the touchless detecting system, wherein the touchless detecting system is configured to transmit an ultrasonic signal, receive a reflected ultrasonic signal, measure an echoic profile of said reflected ultrasonic signal and determine the movement from said echoic profile, using edge detection in the echoic profile to detect preferentially the user's fingertip over other parts of the user's hand;
  instructions for associating said movement with a predicted touch on said surface; and
  instructions for issuing a report of said predicted touch.

12. The non-transitory, computer-readable medium as claimed in claim 11 wherein the report of said predicted touch comprises information relating to a position on the surface that it is predicted the user will touch.

13. The non-transitory, computer-readable medium as claimed in claim 11 wherein the report of said predicted touch comprises information relating to a speed and/or direction of the user's finger prior to touching the screen.

14. The non-transitory, computer-readable medium as claimed in claim 11 comprising instructions for providing feedback in response to said predicted touch.

15. The non-transitory, computer-readable medium as claimed in claim 14 comprising instructions for providing feedback regarding a predicted position of the touch.

16. The non-transitory, computer-readable medium as claimed in claim 14 comprising instructions for providing feedback which is at least one of: visual, audible or haptic.

17. The non-transitory, computer-readable medium as claimed in claim 14 comprising instructions for enlarging a GUI element as the finger approaches the touch-sensitive surface.

18. The non-transitory, computer-readable medium as claimed in claim 11 comprising instructions for using the report of predicted touch to initiate or alter a process in the device which is not apparent to the user.

19. The non-transitory, computer-readable medium as claimed in claim 11 comprising instructions for carrying out an action or function on the basis of the report of predicted touch but carrying out no further action or function if/when the surface is touched.

20. An electronic device comprising
  a touch-sensitive surface and
  a touchless detecting system for detecting movement of a finger towards the surface, wherein the touchless detecting system comprises
    three or more ultrasound receiver-transmitter combinations and is configured to provide time-of-flight measurements between each of the receiver-transmitter combinations, use said time-of-flight measurements to calculate an echoic profile and determine the movement from said echoic profile;
  the device being configured to associate said movement with a predicted touch on said surface and to issue a report of said predicted touch, said touchless detecting system being further configured to use the echoic profile to detect preferentially the user's fingertip over other parts of the user's hand.

21. An electronic device comprising
  a touch-sensitive surface and
  a touchless detecting system for detecting movement of a finger towards the surface, wherein the touchless detecting system comprises
    an ultrasound transmitter and is configured to transmit using said ultrasound transmitter an ultrasonic signal comprising a chirp, receive a reflected ultrasonic signal, measure an echoic profile of said reflected ultrasonic signal and determine the movement from said echoic profile;
  the device being configured to associate said movement with a predicted touch on said surface and to issue a report of said predicted touch, said touchless detecting system configured to use the echoic profile to detect preferentially the user's fingertip over other parts of the user's hand.

* * * * *